(12) United States Patent
MacDonald et al.

(10) Patent No.: US 10,263,449 B2
(45) Date of Patent: Apr. 16, 2019

(54) BATTERY CHARGING SYSTEMS AND METHODS

(71) Applicant: Bose Corporation, Framingham, MA (US)

(72) Inventors: Thomas E. MacDonald, Boston, MA (US); Craig Jackson, Waltham, MA (US); Greg J. Zastoupil, North Grafton, MA (US); Randy G. Banton, Lunenburg, MA (US)

(73) Assignee: BOSE CORPORATION, Framingham, MA (US)

( * ) Notice: Subject to any disclaimer, the term of this patent is extended or adjusted under 35 U.S.C. 154(b) by 0 days.

(21) Appl. No.: 15/639,960

(22) Filed: Jun. 30, 2017

(65) Prior Publication Data
US 2019/0006855 A1    Jan. 3, 2019

(51) Int. Cl.
*H02J 7/00* (2006.01)
*H04R 27/00* (2006.01)
*H04R 3/00* (2006.01)

(52) U.S. Cl.
CPC ............ *H02J 7/007* (2013.01); *H02J 7/0047* (2013.01); *H04R 3/00* (2013.01); *H04R 27/00* (2013.01)

(58) Field of Classification Search
CPC .......... H02J 9/065; H02J 7/0068; H02J 7/007; H02J 7/0052; H02J 7/025; H02J 7/0021; H02J 7/0047; H02J 2007/0037; H02J 2007/0039; H02J 2007/004; H02J 2007/0062; H02J 2007/0098; H02J 7/0024

USPC ........................................ 320/121, 132, 160
See application file for complete search history.

(56) References Cited

U.S. PATENT DOCUMENTS

| | | |
|---|---|---|
| 5,254,931 A | 10/1993 | Martensson |
| 5,949,216 A | 9/1999 | Miller |
| 5,986,433 A | 11/1999 | Peele et al. |
| 7,388,349 B2 | 6/2008 | Elder et al. |
| 7,825,636 B2 | 11/2010 | Partin et al. |
| 8,070,162 B1 * | 12/2011 | Butcher .................... A63F 1/04 273/272 |
| 8,674,662 B2 | 3/2014 | Chueh et al. |
| 8,963,484 B2 | 2/2015 | Hu et al. |
| 2005/0242777 A1 | 11/2005 | Van Beek et al. |
| 2009/0108677 A1 * | 4/2009 | Walter ................ H02M 3/1582 307/80 |
| 2010/0231171 A1 * | 9/2010 | De Cremoux ........ H02J 7/0068 320/137 |

(Continued)

*Primary Examiner* — Nghia M Doan
(74) *Attorney, Agent, or Firm* — Schmeiser, Olsen & Watts LLP

(57) ABSTRACT

A loudspeaker battery charging device comprises a three-position selector that establishes one of a first, second, or third charging mode for charging a battery of a loudspeaker. The first charging mode pertains to an off state of the loudspeaker. The second charging mode pertains to an on state of the loudspeaker. The third charging mode pertains to a fast charge state of the loudspeaker. A controller receives a signal from the three-position power switch indicating a selected charging mode of the first, second, or third charging mode. A switch circuit outputs a first power-supplying level in response to the first or second charging mode and outputs a second power-supplying level higher than the first power-supplying level in response to the third charging mode.

19 Claims, 6 Drawing Sheets

(56) References Cited

U.S. PATENT DOCUMENTS

2010/0237840 A1\* 9/2010 Walter .................. H02J 7/0068
323/282

\* cited by examiner

BATTERY CHARGING SYSTEMS AND METHODS

BACKGROUND

This description relates generally to battery charging techniques, and more specifically, to charging a battery of a portable powered public address (PA) speaker sound system.

BRIEF SUMMARY

In accordance with one aspect, a loudspeaker battery charging device comprises a three-position selector that establishes one of a first, second, or third charging mode for charging a battery of a loudspeaker, the first charging mode pertaining to an off state of the loudspeaker, the second charging mode pertaining to an on state of the loudspeaker, the third charging mode pertaining to a fast charge state of the loudspeaker; a controller that receives a signal from the three-position power switch indicating a selected charging mode of the first, second, or third charging mode; and a switch circuit that outputs a first power-supplying level in response to the first or second charging mode and that outputs a second power-supplying level higher than the first power-supplying level in response to the third charging mode.

Aspects may include one or more of the following features.

The loudspeaker battery charging device may further comprise a multiuse light emitting diode (LED) circuit that indicates the selected one of the first, second, or third charging mode.

The at least one indicator may include an LED that indicates whether the loudspeaker is powered on and further indicates the first, second, or third charging mode.

The selector may include a mechanical switching device that, when selected, establishes the first, second, or third charging mode.

The loudspeaker battery charging device may further comprise a converter that receives a source of power from a power source, and outputs the source of power to the battery according to the state of the selector that establishes the charging mode, limited by an audio volume level of the loudspeaker.

In changing the switch position, the controller may set the set point voltage for the switch mode battery charge controller which changes the duty cycle of the converter, which in turn may set the correct current for the selected battery charge rate.

In the third charging mode, the battery charge rate may be greater than the battery charge rate of the first and second charging modes.

In the first and third charging modes, the loudspeaker may enter a low energy mode when the charging of the battery is complete.

In the second charging mode, when audio is at a threshold for a power-related calculation, the charger may stop charging until the average power is below the threshold.

When the audio is on, the audio power may be prioritized over the battery charge.

In accordance with one aspect, a speaker sound system comprises a battery and a power switch, wherein in a first position of the power switch, audio is off and the battery receives a first power-supplying level, wherein in a second position, audio is on, and the battery receives the first power-supplying level, and wherein in a third position, audio is off, and the battery receives a second power-supplying level that is greater than the first power-supplying level.

Aspects may include one or more of the following features.

The speaker sound system may further comprise a multiuse light emitting diode (LED) circuit that indicates the selected one of the first, second, or third position of the power switch.

The multiuse light emitting diode (LED) circuit may include an LED that indicates whether the system is powered on and further indicates the first, second, or third position of the power switch.

The power switch may comprise a three-position selector that indicates a selection of one of the first, second, or third charging mode for charging the battery, the first charging mode corresponding to the second position and pertaining to an off state of the speaker sound system, the second charging mode corresponding to the second position and pertaining to an on state of the speaker sound system, the third charging mode corresponding to the third position and pertaining to a fast charge state of the speaker sound system.

In the third charging mode, the battery charge rate may be greater than the battery charge rate of the first and second charging modes.

In accordance with one aspect, an apparatus for charging a battery of a loudspeaker, comprises a controller that receives a signal from the three-position rocker switch indicating a selected charging mode of a plurality of charging modes, comprising: a first charging mode pertaining to an off state of the loudspeaker, wherein the battery is charged at a first charge rate; a second charging mode pertaining to an on state of the loudspeaker, wherein the battery is charged at the first charge rate; a third charging mode pertaining to the off state of the loudspeaker, wherein the battery is charged at a second charge rate greater than the first charge rate; and a power switch that outputs a first power-supplying level in response to the first or second charging mode for establishing the first charge rate, and that outputs a second power-supplying level higher than the first power-supplying level in response to the third charging mode for establishing the second charge rate.

Aspects may include one or more of the following features.

In the first or third charging mode, when the charging operation is complete, the apparatus may enter a low power mode, where some, most, or all electronic components of the loudspeaker are turned off to conserve energy.

The power switch may comprise a three-position mechanical selector that indicates a selection of one of the first, second, or third charging mode for charging the battery, the first charging mode corresponding to a first position of the mechanical selector and pertaining to an off state of the speaker sound system, the second charging mode corresponding to a second position of the mechanical selector and pertaining to an on state of the speaker sound system, the third charging mode corresponding to a third position of the mechanical selector and pertaining to a fast charge state of the speaker sound system.

In the second charging mode, when audio is at a threshold for a power-related calculation, the controller may stop charging until a calculated power value is below the threshold.

When the audio is on, the audio power may be prioritized over the battery charge.

BRIEF DESCRIPTION

The above and further advantages of examples of the present inventive concepts may be better understood by referring to the following description in conjunction with the accompanying drawings, in which like numerals indicate like structural elements and features in various figures. The drawings are not necessarily to scale, emphasis instead being placed upon illustrating the principles of features and implementations.

DETAILED DESCRIPTION

Public address (PA) speaker systems are well-known for amplifying the reproduction of sound to be heard by a group of people. Portable powered PA speaker systems rely on rechargeable batteries, for example, comprising nickel cadmium, lithium ion, and so on for repeat and prolonged use. When a speaker system battery is recharged, a user may desire for the battery to be charged as quickly as possible. However, other factors may affect the battery charge rate, for example, whether audio is on and the loudspeaker is operational at the time of charging.

In brief overview, a battery charging system is constructed and arranged to charge a loudspeaker battery according to at least three different charging options, or modes. One mode may provide the fastest charging time among the available charging options, but requires the system to be powered off in order to receive sufficient power to perform a fast charging operation. Another mode may provide a slower charging time when the system is powered off, or operating at a lower power level, or at least where audio is not produced by the speaker system, for example, to preserve battery performance which may be compromised by the additional power received in the fast charging mode. Yet another mode may permit audio to be output, but also allows the battery to be charged at the same or similar rate as when the system is otherwise powered on and operational.

In some examples, a power supply can be optimized with respect to cost/performance by providing modes corresponding to a "normal" charge rate with audio and a fast charge rate with no audio. On the other hand, fast charge and audio together would require a substantially larger power supply with additional cooling required for sufficient heat dissipation. In these examples, the system can go enter a low power mode to minimize power consumption after a charge is complete an in "off" mode and/or a "fast charge" mode.

When the battery charging system is powered on, the system remains on for applications where it is not desirable to go into a low power mode, for example, a Pro audio market. The system will enter into the low power mode, which may be higher than a power level at the end of a charge when the system enters a sleep mode, when the system is idle for a predetermined period of time, for example, 1 hour in the ON position when no audio is detected. In some examples, the battery charging system can be in an "off" mode, in which the system charges at a lower charge rate than the fast charge rate for optimal battery cell performance.

Figure 1:
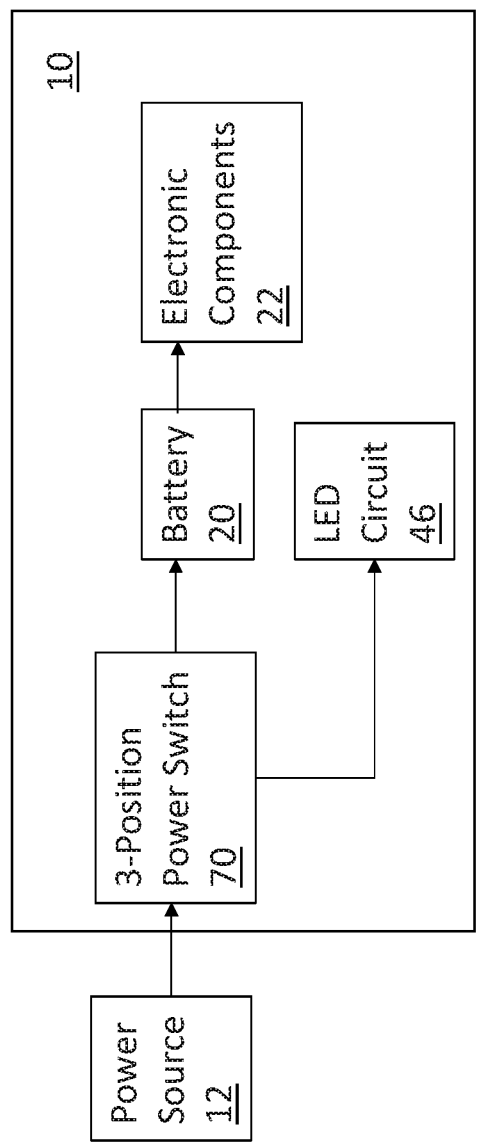
FIG. 1 is a block diagram of a loudspeaker at which examples of the present inventive concepts are practiced.

Referring to FIG. 1, in some examples a speaker sound system 10, for example, a loudspeaker assembly or the like, may include but not be limited to a battery 20, a set of electronic components 22 powered by the battery 20, an LED circuit 46, and a 3-position power switch 70.

The power switch 70 is constructed and arranged to charge the battery 20 under three different charging modes. In the first charging mode (CM 1), or normal charge mode, the power switch 70 is in a first position, e.g., POS 1 shown in FIG. 3. Here, the first position may be an OFF position and therefore not outputting audio. More specifically, the system 10 is powered down, or at least audio is off or otherwise not being output. Other states, or modes, may be provided where the amplifier is turned off, or inactivated, in a lower power mode after a predetermined amount of system activity, which may be monitored and controlled by the controller 50. In some examples, a "fast charge" and "off" mode may be a single, or same, mode.

The power switch 70 receives and outputs a first power-supplying level to the battery 20, for example, at or about 1.3 ampere (A) of current for a charge time less than 7 hours but not limited thereto, depending on cell capacity and/or other well-known factors.

Figure 4:
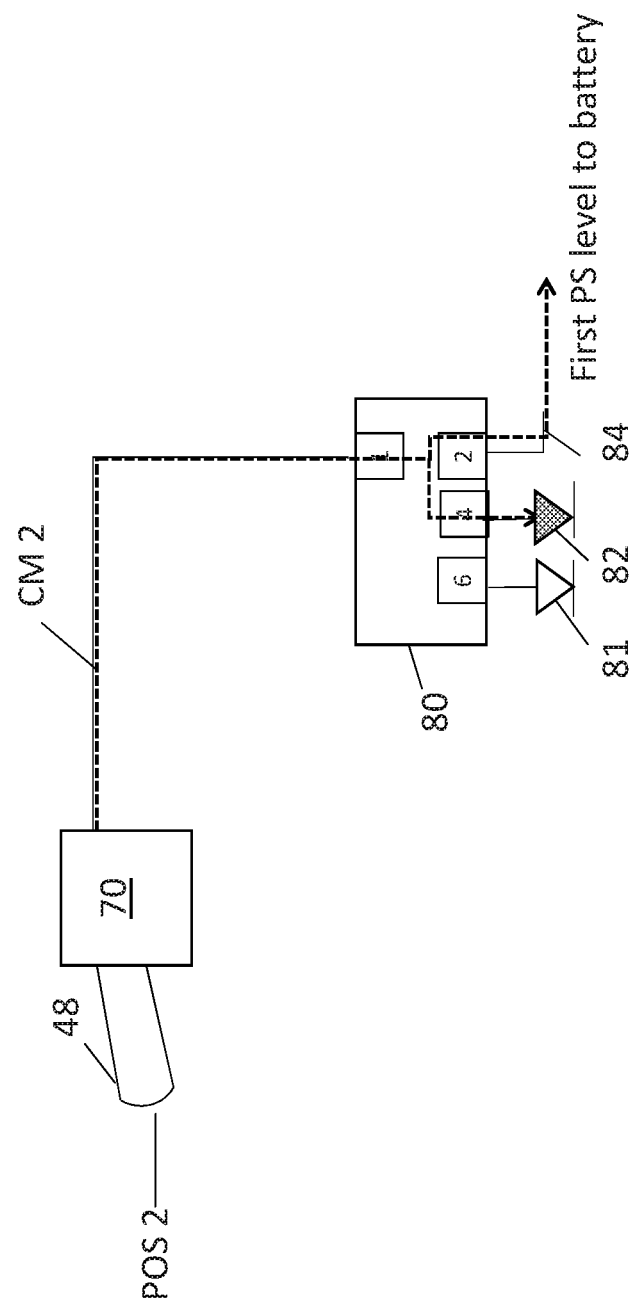
FIG. 4 is a circuit diagram of a power switch and LED configuration, in accordance with some examples.

In the second charging mode (CM 2), the power switch 70 is in a second position, e.g., POS 2 shown in FIG. 4. Here, the system 10 is powered on so that audio is capable of being produced and output from the loudspeaker(s). The power switch 70 can nevertheless output the first power-supplying level, e.g., 1.3 A (not limited thereto), or an amount of power similar to the first power-supplying level to the battery 20 even though the system 10 is powered on. In some examples, when audio power is below a predetermined threshold, the charge time is less than 7 hours. However, when audio power is above the threshold, the power switch 70 may temporarily inactivate charging. In other examples, instead of inactivating charging under these conditions, charging may instead be performed at a low charging rate.

Figure 5:
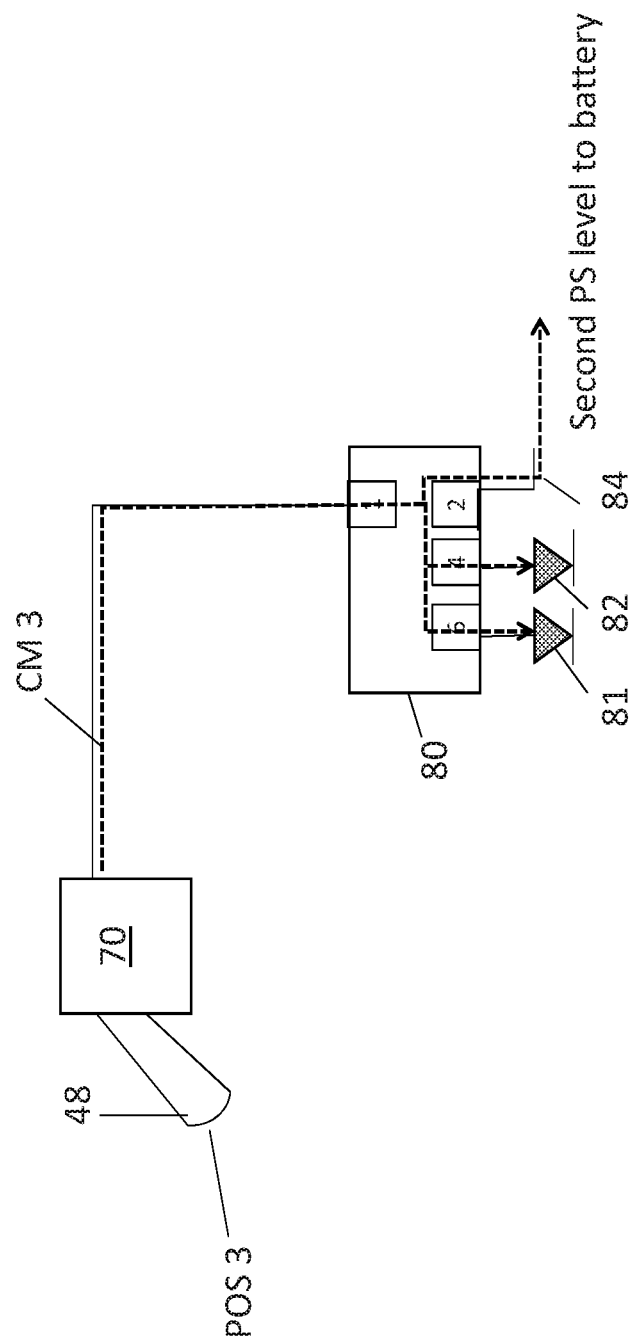
FIG. 5 is a circuit diagram of a power switch and LED configuration, in accordance with some examples.

In the third charging mode (CM 3), or fast charge mode, the power switch 70 is in a third position, e.g., POS 3 shown in FIG. 5. Here, the system 10 is powered down, or at least audio is off or otherwise not being output. However, the power switch 70 receives an output of a second power-supplying level to the battery 20, for example, 3.2 A (not limited thereto), which is higher than the first power-supplying level. In this mode (CM 3), when a charging operation is complete, the system may enter into a low power mode, where some, most, or all electronic components 22 are turned off, i.e., do not receive power, in order to conserve energy. In some examples, the foregoing may occur in a power off mode as well after charging is complete.

Although first and second power-supplying levels are described, more than two power levels may equally apply, depending on the number of modes or other factors related to charging or recharging a battery. For example, the system may increase the power level to a higher power-supplying level than the second power-supplying level depending on the state of the battery 20. In a specific example, a fast charge rate and time may be at or about 3.2 A for a charge time less than 3 hours and a normal charge rate at or about 1.3 A for a charge time less than 7 hours. This example is not limited to these values, and these values may vary depending on cell capacity and/or other well-known factors. Also, when audio is playing, i.e., when the loudspeaker is operational for outputting audio, the charging time may be longer if power required to produce the audio output is high, whereby the power switch 70 may temporarily inactivate charging until the power is reduced.

A user may prefer the first mode over the third mode (faster charging) in examples where there If there is no battery, where turning the system to "off" is more intuitive than "fast charge" to turn off. Also, when charging in "off" mode, the charge rate is lower than that of a fast charge and system will run cooler. Depending on thermal performance, charging may be performed at a higher ambient environment before a maximum or over temperature is reached. A fast charge will typically approach an over temperature more quickly at higher ambient, i.e., more heat is generated.

The light emitting diode (LED) circuit 46 is constructed and arranged to output a charging mode result to an indicator, such as an LED or other visual, tactile, and/or audio indicator for a viewer to determine the charging mode. The indicators, e.g., LEDs, of the LED circuit 46 may be displayed at any region of the loudspeaker 10, for example, proximal a rocker switch, toggle, or other mechanical switching device of the selector 48, or near a front grill of the loudspeaker 10 from where audio is output. The LEDs may have multiple uses, for example, part of a display when activating a power button, for example, a Bluetooth pairing button, by pressing it for a predetermined period of time to display a fuel gauge readout. In a related example, a user may hold down the power button for an LED to produce a different color, flash rate, sequence, or other indicator that informs the viewer of the charging mode.

A feature of the portable powered public address (PA) speaker sound system 10 is that it may comply with energy efficiency standards imposed by a government regulation that requires battery chargers to consume less energy. For example, a requirement may be established regarding total energy consumption over a 24 hour period. Once a charging operation is complete, the electronics may enter a very low power state. In some examples, when the system is off or in a fast charge mode and charging is complete, the system may enter a lower power mode to meet government regulations. For example, the system may enter a low power mode, where some, most, or all electronic components 22 are turned off, i.e., do not receive power, in order to conserve energy.

Figure 2:
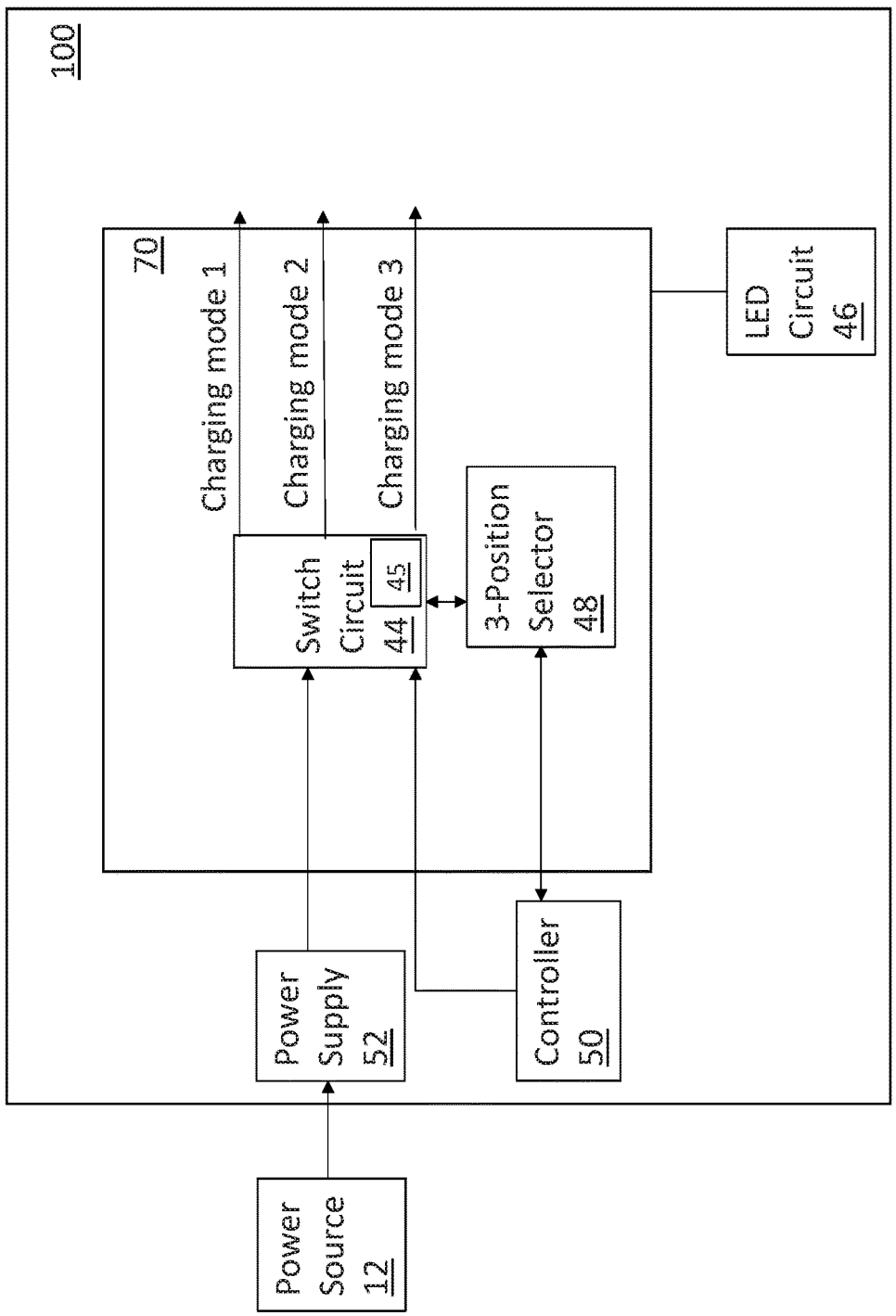
FIG. 2 is a block diagram of a charging device, according to other examples.

FIG. 2 is a block diagram of a charging device 100 in accordance with some examples, which may be implemented in the speaker sound system 10 of FIG. 1. For example, the power switch 70 and LED circuit 46 may be part of the charging device 100. The charging device 100 in turn may be implemented in the speaker sound system 10 of FIG. 1.

As shown in FIG. 2, the charging device 100 may include but not limited to a switch circuit 44, an LED circuit 46, a selector 48, and a controller 50. As shown in FIG. 2, the switch circuit 44 and selector 48 may be part of the power switch 70. In some examples, elements of the charging device 100, for example, a charging circuit, is located in a battery 20. Other elements such as the power supply 52 may be part of the loudspeaker 10 and/or the charging device 100.

The charging device 100 includes a power supply 52 that converts a source of alternating current (AC) electricity received from a system power source 12, for example, from a wall electrical outlet, AC line, vehicle cigarette lighter outlet, and so on, to a source or direct current (DC) electricity. The switch circuit 44 receives the DC voltage, for example, 26V. The power supply 52 may draw an amount of power based on a charger setting at the switch circuit 44, i.e., for setting the correct voltage and current for charging the battery 20, thereby delivering conditioned power for charging the battery 20. In some examples, a sensor (not shown) may detect whether the power source 12 is in electrical communication with the charging device 100. If no power is attached, then the speaker sound system 10 will run off of the battery 20 in an "on" mode. In off and fast charge modes described herein, the speaker sound system 10 does not require use of the battery 20 to conserve the battery storage when system 10 is not in use. Also, when the charging operation is complete, the system may enter a low power mode, where some, most, or all electronic components 22 are turned off, i.e., do not receive power, in order to conserve energy. Referring to FIG. 1, the particular details of the configuration and operation of such electronics 22, and variations thereof, are well known in the art and are not discussed further herein except as to assist in understanding the present invention.

The conditioned power delivered by the switch circuit 44 can include a value, i.e., volt, ampere, watt, and so on, output by the switch circuit 44 according to the corresponding charging mode. The amount of power received from the power source 12 may be dependent on the audio volume level or other power-dependent functions of the loudspeaker. The switch circuit 44 may include a converter 45 that performs a power conversion operation to the correct current according to a selected charging mode. The converter 45 may be a buck converter or the like. This may include a computer chip is used where to set a charge current by a voltage set point. Voltage set points may be modified by a resister divider circuit or the like.

The controller 50 controls the current that is output from the switch circuit 44 in response to a signal received from the selector 48 that establishes the charging mode, for example, by raising a magnitude of the current to the second power-supplying level for performing a fast charge of the battery 20. In particular, the controller 50 changes the duty cycle of a switching circuit of the power switch 70 using the converter 45 to adjust a charge current, and therefore adjusting the charge rate according to the selected charging mode. For example, the controller 50 can activate the switch circuit 44 in response to a switch position of the selector 48 and/or a determination by the power supply sensor (not shown), audio detector (not shown) and/or other sensor. The controller 50 may also control power preferences, for example, ensuring that voltages, currents, and/or other power-related outputs, for operating the acoustic driver when powered on are provided over power-related outputs for charging the battery 20.

More specifically, the loudspeaker 10 for example shown in FIG. 1 is configured for a particular amount of power consumption, and includes other circuits (not shown), such as a power supply and so on, for providing power to the electrical components of the loudspeaker 10 required for operating the loudspeaker 10. In some examples, when the power charge circuit 44 operates in a fast charge mode, the power switch 70 sets a voltage set point on the switch mode battery controller integrated circuit (IC) so that the charge current is set to a particular value, such as 3.2 A. The controller IC in turn uses a buck converter or the like, for example, part of converter 45, which in turn may be part of the switch circuit 44, to perform a power conversion operation to set the correct current through changing the duty cycle of the switch circuit 44.

The switch circuit 44 outputs a conditioned source of power to the battery 20 according to the state of the selector 48 that establishes the charging mode. For example, the selector 48 constructed and arranged as a rocker switch, toggle switch, or the like. In other examples, the selector may be a computer-generated switch, for example, where at a user interface of an electronic display a user inputs parameters or commands for commanding the controller 50 to perform in one of the first, second, or third charge modes. Here, the controller 50 may include software, firmware, or a combination thereof, for processing such parameters or commands received from the user interface.

Figure 3:
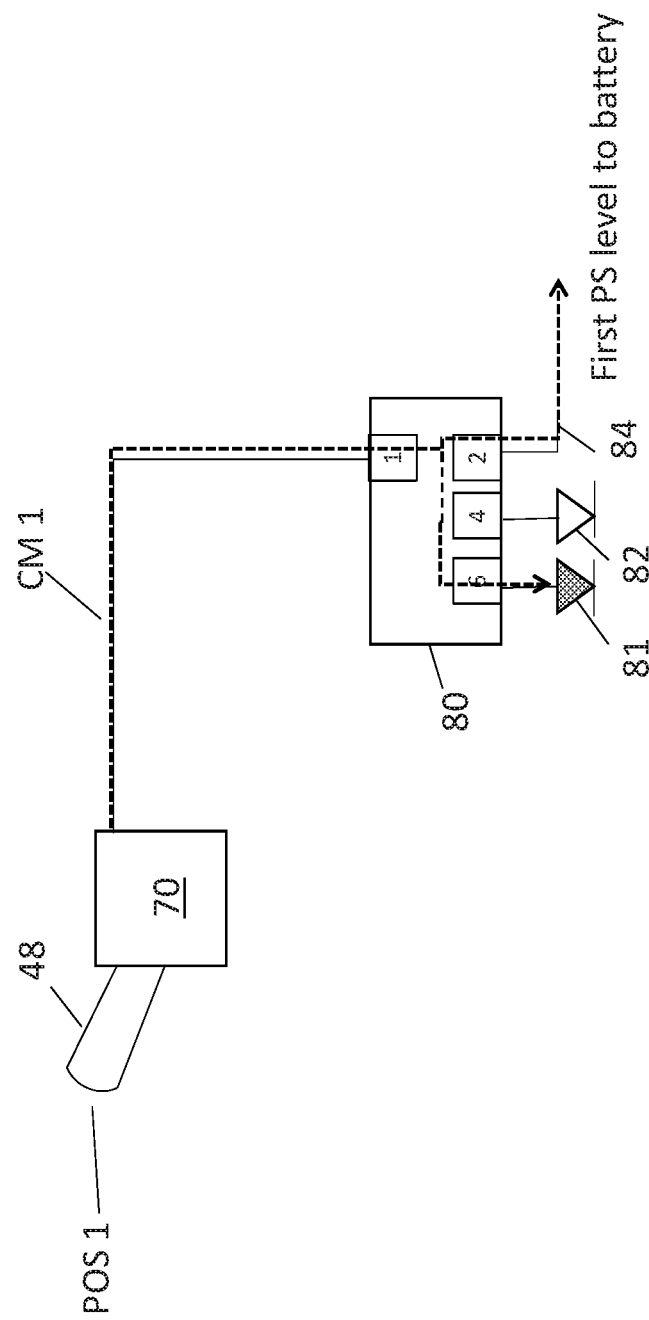
FIG. 3 is a circuit diagram of a power switch and LED configuration, in accordance with some examples.

As shown in FIG. 3, the selector 48 in a first position (POS 1) powers down the system 10 so that audio is inactive or off, also referred to as an "OFF" mode. Also, the battery 20 receives a first source of power for charging or recharging. In particular, the first power-supplying level, e.g., 1.3 A (not limited thereto), is output 84 via a terminal (1) at terminal block 80, computer chip, or the like and output via another terminal (2) to the battery 20. An LED 81 or other indicator is activated via another terminal (6) of the terminal block 80 or related switching device, indicating the first charging mode when audio is off. In the first charging mode and/or third charging mode, when the charging operation is complete, the system may enter a low power mode, where some, most, or all electronic components 22 are turned off, i.e., do not receive power, in order to conserve energy.

As shown in FIG. 4, the selector 48 in a second position (POS 2) powers up the system 10 so that audio is active or otherwise capable of producing sound at its acoustic drivers, also referred to as an "ON" mode where AC power or battery power is applied so that the loudspeaker 10 may operate, e.g., audio may be played. In some examples where the system power draw from an audio output is below a set threshold value, the battery 20 may continue to receive a same or similar source of power for charging or recharging as that received when the audio is off in the first position of the selector 48. Here, the charge current must be reduced to a lower rate than in a fast charge mode in order to both charge the battery 20 and play audio from the speaker. In some examples, when audio is on, the audio power is prioritized over the battery charge.

In the example shown in FIG. 4, the first power-supplying level, e.g., 1.3A (not limited thereto), is output 84 via a terminal (1) at terminal block 80, computer chip or related switching device and output via terminal (2) to the battery 20 according to a signal, or first source of power corresponding to the signal, received at terminal (1) via a different conductive path from the power switch 70. Here, the first power-supplying level occurs when audio is below a predetermined threshold for an average power draw or other calculation related to power. Once the average power draw from the audio reaches the threshold for a specified time, the charging device 100 stops charging until the average power is below the threshold for specified time and then the charging operation resumes if necessary. The controller 50 and/or switch circuit 44 may control the charging device 100 accordingly.

An LED 82 or other indicator is activated via another terminal (4) of the terminal block 80, computer chip, or related switching device, indicating the second charging mode when audio is on. A feature here is that a user may enjoy full audio performance, e.g., a maximum audio volume, from the system 10 while charging the battery 20, albeit less than a battery charge rate where audio is not playing. To operate the loudspeaker to play audio, the charge current can be decreased. Therefore, tradeoffs may exist between power supply size, thermal characteristic, cost, and charge rate. In the second charging mode, since a predetermined amount of current is required to power the system 10 when audio is on, the amount of available power in the second charging mode is limited. Therefore, the amount of power output to charge or recharge the battery 20 in the second charging mode is preferably limited to no more than the first power-supplying level. For example, a charge rate at an off-position and on-position may be the same.

In some examples, terminal block 80, or related computer chip or the like, may have three input terminals, each receiving a voltage input corresponding to a different charging mode, for example, input terminals for an "ON" mode, "OFF" mode, and "Fast charge" mode, respectively established by a position of the rocker switch or related selector 48.

As shown in FIG. 5, the selector 48 in a third position (POS 3) powers down the system 10 so that audio is inactive or off, similar to the first position (POS 1). However, the selector 48 in the third position (POS 3) also permits the battery 20 to receive a second source of power that greater than the first source of power provided in the first (POS 1) or second (POS 2) selector positions. In particular, the switch instructs the controller 50 to change the duty cycle to the second power-supplying level, e.g., 3.2 A, which in turn output to the battery 20. The system 10 may draw more power from the power supply 52 since the charge current is higher.

Also in FIG. 5, both LEDs 81 and 82 or other indicators are activated, e.g., illuminated, indicating the third, or fast, charging mode when audio is off. In some examples, at least one LED is a bi-color LED. For example, LED 81 may indicate whether the loudspeaker is powered on, and LED 82 can indicate by a first color that the system is charging the battery 20 at the first power-supplying level and a second color that the system is charging the battery 20 at the second power-supplying level. In other examples, a same LED may both indicate whether the loudspeaker is powered on and the charging mode, for example, by pressing a button that activates the LED.

Figure 6:
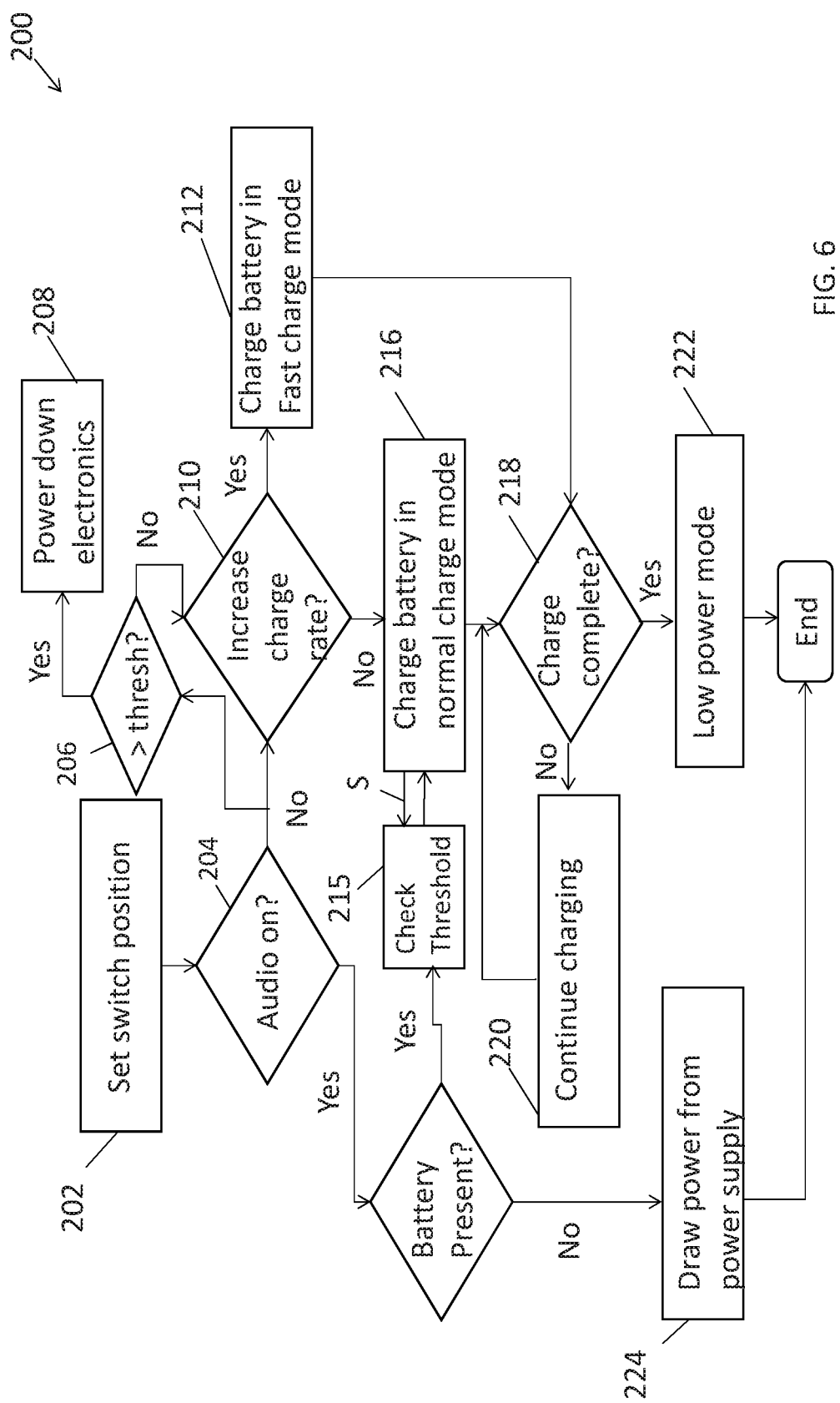
FIG. 6 is a flow diagram of a method for charging a portable powered public address (PA) speaker sound system, in accordance with some examples.

FIG. 6 is a flow diagram of a method 200 for charging a portable powered public address (PA) speaker sound system, in accordance with some examples. When describing the method 200, reference may be made to elements of the loudspeaker 10 of FIGS. 1-5.

At block 202, a switch position is set, in particular, to one of the first (POS 1), second (POS 2), or third (POS 3) positions.

At decision diamond 204, a determination is made by the controller 50 via a signal received from the 3-position power switch 70 whether audio is on. The received signal is generated in response to a location of a rocker switch location at position POS 1 or 2 shown in FIG. 3 or 4, respectively, or in response to input to a user interface of a computer display. If yes, then the method 200 proceeds to block 210, where the battery 20 is charged according to a normal charge mode, for example, activating the charging device to charge the battery 20 at the first power-supplying level.

Also, a determination is made at decision diamond 204 whether the amount of time that the audio is off exceeds a predetermined amount of time, for example, 1 hour, which is stored and processed at the controller 50. If yes, then at block 208 a predefined set of electronic components are powered down to preserve overall power.

If at decision diamond 204 a determination is made by the controller 50 that audio is not on, e.g., defined by a switch position, or that the loudspeaker 10 is otherwise not powered on, then the method 200 proceeds to decision diamond 210, where a determination is made by the controller 50 a signal received from the 3-position power switch 70 whether to increase the charge rate to a fast charge mode. If at decision diamond 204 a determination is made that audio is on, then the method 200 proceeds to decision diamond 214 where a determination is made whether a battery is present.

If yes at decision diamond 210, then at block 212, the battery 20 is charged according to a fast charge mode, for example, activating the charging device to charge the battery 20 at the second power-supplying level, e.g., 3 A. If audio is on (yes at decision diamond 204) and battery is present (yes at decision diamond 214), the method 200 proceeds to block 215 where an audio threshold is checked. The audio threshold may relate to power, volume, or other calculated value. Although not shown, block 215 may include a decision diamond where a determination is made whether a current audio is less than a threshold value, and if yes, then the battery continues to be charged at block 216.

At block 216, the battery is charged in a normal mode, for example, 1.3 A. If battery is not present (no at decision diamond 214), then at block 224 power is drawn from the battery 20 and/or via the power supply. At predetermined times or threshold levels or the like, the method 200 may proceed from block 216 back to block 215, where the threshold is checked again. If the current audio is greater than the threshold value, then the charging may be stopped until the audio threshold drops below the threshold.

If at decision diamond 210, a determination is made not to increase the charge rate, then the method 200 proceeds to block 216, where the battery 20 is charged according to a normal charge mode.

At decision diamond 218, a determination is made by the controller 50 whether the battery charge is complete. If yes, then the method 200 ends. Alternatively or in addition, at block 222 the system may enter into a low power mode to conserve energy, for example, according to government regulations, if in an off or fast charge mode after charging is complete. Otherwise, the method 200 proceeds to block 220 where the battery 20 is charged according to the respective charging mode until the battery 20 is completely charged.

It is to be understood that the foregoing description is intended to illustrate and not to limit the scope of the invention, which is defined by the scope of the appended claims. Other embodiments are within the scope of the following claims.

What is claimed is:

1. A loudspeaker battery charging device, comprising:
a three-position selector that establishes one of a first, second, or third charging mode for charging a battery of a loudspeaker, the first charging mode pertaining to an off state of the loudspeaker, the second charging mode pertaining to an on state of the loudspeaker, the third charging mode pertaining to a fast charge state of the loudspeaker;
a controller that receives a signal from the three-position selector indicating a selected charging mode of the first, second, or third charging mode; and
a switch circuit that outputs a first power-supplying level in response to the first or second charging mode and that outputs a second power-supplying level higher than the first power-supplying level in response to the third charging mode, wherein the controller further controls the switch circuit to output the first power-supplying level in response to the received signal from the three-position selector indicating the first or second charging mode, and to output the second power-supplying level in response to the received signal from the three-position selector indicating the third charging mode.

2. The loudspeaker battery charging device of claim 1 further comprising a multiuse light emitting diode (LED) circuit that indicates the selected one of the first, second, or third charging mode.

3. The loudspeaker battery charging device of claim 2, wherein the at least one indicator includes an LED that indicates whether the loudspeaker is powered on and further indicates the first, second, or third charging mode.

4. The loudspeaker battery charging device of claim 1, wherein the selector includes a mechanical switching device that, when selected, establishes the first, second, or third charging mode.

5. The loudspeaker battery charging device of claim 4, further comprising a converter that receives a source of power from a power source, and outputs the source of power to the battery according to the state of the selector that establishes the charging mode, limited by an audio volume level of the loudspeaker.

6. The loudspeaker battery charging device of claim 5, wherein in changing the switch position, the controller sets the set point voltage for the switch mode battery charge controller which changes the duty cycle of the converter, which in turn sets the correct current for the selected battery charge rate.

7. The loudspeaker battery charging device of claim 1, wherein in the third charging mode, the battery charge rate is greater than the battery charge rate of the first and second charging modes.

8. The loudspeaker battery charging device of claim 1, wherein in the first and third charging modes, the loudspeaker enters a low energy mode when the charging of the battery is complete.

9. The loudspeaker battery charging device of claim 8, wherein in the second charging mode, when audio is at a threshold for a power-related calculation, the charger stops charging until the average power is below the threshold.

10. The loudspeaker battery charging device of claim 1, wherein when the audio is on, the audio power is prioritized over the battery charge.

11. A speaker sound system, comprising:
a battery; and
a power switch, wherein in a first position of the power switch, audio is off and the battery receives a first power-supplying level, wherein in a second position, audio is on and the battery receives the first power-supplying level, and wherein in a third position, audio is off and the battery receives a second power-supplying level that is greater than the first power-supplying level,
wherein the power switch comprises a three-position selector that indicates a selection of one of the first, second, or third charging mode for charging the battery, the first charging mode corresponding to the first position and pertaining to an off state of the speaker sound system, the second charging mode corresponding to the second position and pertaining to an on state of the speaker sound system, the third charging mode corresponding to the third position and pertaining to a fast charge state of the speaker sound system, and wherein the power switch is controlled by a received signal from the three-position selector to output the first power-supplying level in response to the received signal from the three-position selector indicating the first or second charging mode, and to output the second power-supplying level in response to the received signal from the three-position selector indicating the third charging mode.

12. The speaker sound system of claim 11, further comprising a multiuse light emitting diode (LED) circuit that indicates the selected one of the first, second, or third position of the power switch.

13. The speaker sound system of claim 12, wherein the multiuse light emitting diode (LED) circuit includes an LED that indicates whether the system is powered on and further indicates the first, second, or third position of the power switch.

14. The speaker sound system of claim 11, wherein in the third charging mode, the battery charge rate is greater than the battery charge rate of the first and second charging modes.

15. An apparatus for charging a battery of a loudspeaker, comprising:
   a controller that receives a signal from the three-position rocker switch indicating a selected charging mode of a plurality of charging modes, comprising:
      a first charging mode pertaining to an off state of the loudspeaker, wherein the battery is charged at a first charge rate;
      a second charging mode pertaining to an on state of the loudspeaker, wherein the battery is charged at the first charge rate;
      a third charging mode pertaining to the off state of the loudspeaker, wherein the battery is charged at a second charge rate greater than the first charge rate; and
   a power switch that outputs a first power-supplying level in response to the first or second charging mode for establishing the first charge rate, and that outputs a second power-supplying level higher than the first power-supplying level in response to the third charging mode for establishing the second charge rate, wherein the controller further controls the power switch to output the first power-supplying level in response to the received signal from the three-position rocker switch indicating the first or second charging mode, and to output the second power-supplying level in response to the received signal from the three-position rocker switch indicating the third charging mode.

16. The apparatus of claim 15, wherein in the first or third charging mode, when the charging operation is complete, the apparatus enters a low power mode, where some, most, or all electronic components of the loudspeaker are turned off to conserve energy.

17. The apparatus of claim 16, wherein the three-position rocker switch comprises a three-position mechanical selector that indicates a selection of one of the first, second, or third charging mode for charging the battery, the first charging mode corresponding to a first position of the mechanical selector and pertaining to an off state of the speaker sound system, the second charging mode corresponding to a second position of the mechanical selector and pertaining to an on state of the speaker sound system, the third charging mode corresponding to a third position of the mechanical selector and pertaining to a fast charge state of the speaker sound system.

18. The apparatus of claim 15, wherein in the second charging mode, when audio is at a threshold for a power-related calculation, the controller stops charging until a calculated power value is below the threshold.

19. The apparatus of claim 15, wherein when the audio is on, the audio power is prioritized over the battery charge.

* * * * *